June 18, 1963　　　　　　　E. LIESER　　　　　　　3,094,053
EXPOSURE COMPENSATING DEVICE FOR PHOTOGRAPHIC CAMERAS
Filed Oct. 17, 1962　　　　　　　　　　　　　　　2 Sheets-Sheet 1

ERNST LIESER
*INVENTOR.*

BY R Frank Smith
Robert W. Hampton
ATTORNEYS

ERNST LIESER
INVENTOR.

United States Patent Office 3,094,053
Patented June 18, 1963

3,094,053
EXPOSURE COMPENSATING DEVICE FOR PHOTOGRAPHIC CAMERAS

Ernst Lieser, Stuttgart-Vaihingen, Germany, assignor to Eastman Kodak Company, Rochester, N.Y.
Filed Oct. 17, 1962, Ser. No. 231,118
Claims priority, application Germany Oct. 21, 1961
2 Claims. (Cl. 95—10)

The present invention concerns a photographic camera, preferably a single lens reflex camera, with a photoelectric exposure control system, the photocell of which is arranged in the ray path of the viewfinder lens or of interchangeable lenses of various maximum apertures.

Cameras with interchangeable lenses of various speeds are well known, in which the diaphragm and/or shutter time adjustment is coupled with an exposure meter. The different maximum apertures of the interchangeable lenses are compensated for, quite commonly, by coupling the exposure meter with the lens diaphragm by adaptor cams, such that when a lens is attached to the camera the meter is set to a value corresponding to the maximum aperture of that lens. Alternatively, when a lens is attached to the camera the exposure control system may be compensatingly adjusted, for example, by adjusting a mask in front of the photocell. These arrangements have the defect of being complex and expensive.

An object of the invention is to provide a simple, inexpensive means to compensate for the attachment of various interchangeable lenses to a camera. This object is achieved, according to the invention, by arranging the lens diaphragm settings of the various interchangeable lenses in equal, geometric spacing, such that the same angular movement of the diaphragm control member produces the same change in adjustment of the diaphragm, regardless of which lens is mounted on the camera. A diaphragm preselecting member is moved through a small or large displacement path for turning the meter instrument about its own axis to align the instrument pointer with a fixed index mark and thereby position a stop member which, upon subsequent operation of the camera actuating member, is engaged by a sensing member moving with the diaphragm setting member for limiting adjustment of the diaphragm.

The photocell is illuminated through the maximum aperture of each attached lens during adjustment of the diaphragm preselecting member. Therefore, at a given field brightness the different lenses illuminate the photocell at different levels, so that correspondingly different angular movements of the instrument body are required to align the instrument pointer with the index mark. Accordingly, the stop member is positioned differently for each lens at a given field brightness, such that a different amount of adjustment of the diaphragm setting member is required subsequently for engaging the sensing member with the stop member. Due to the geometric spacing of the diaphragm settings of the various lenses, the same f/space value is thus set for each lens at any given field brightness.

Other objects of the invention will appear from the following description, reference being made to the accompanying drawings, wherein.

Figure 1:
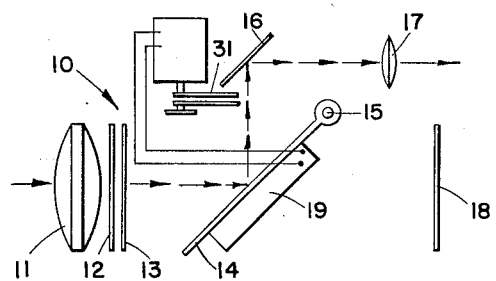
FIG. 1 is a schematic side view of the principal elements of a camera embodying one form of the invention.

With particular reference to FIG. 1 of the drawings, a camera 10 of the single lens reflex type includes an objective or taking lens 11, a shutter 12, a diaphragm 13, a half-silvered mirror 14 pivotally mounted at 15, and a viewfinder system comprising a mirror 16 and an ocular 17. As is well known in this type of camera, a photographic film 18 is normally prevented from being exposed by positioning mirror 14 in the optical path of taking lens 11. A photocell 19 is mounted on the back surface of mirror 14 and normally receives field light through that mirror. A suitable mechanism for retaining mirror 14 in this light-blocking position and releasing it for exposure of film 18 is disclosed in U.S. Patents 2,916,978 and 2,920,544. Also, a diaphragm-shutter mechanism that is suitable for use in conjunction with the mirror release mechanism shown in the above patents is disclosed in British Patent 769,086, this latter patent disclosing the well known Deckel type of shutter.

Figure 2:
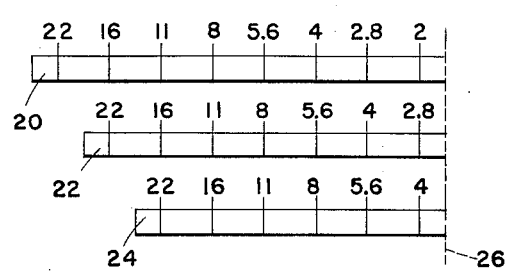
FIG. 2 is a schematic development of the diaphragm setting members for various interchangeable lenses, illustrating the geometric spacings of the positions thereof corresponding to successive diaphragm settings.

Referring to FIG. 2, a diaphragm setting ring 20 is integral with an interchangeable lens unit having a maximum aperture of f/2. Similarly, a setting ring 22 is integral with a lens unit having a maximum aperture of f/2.8 and a setting ring 24 with a lens unit having a maximum aperture of f/4. As indicated by the index marks in FIG. 2, the lens diaphragms, independently of the respective focal lengths of the lenses, are so formed that their respective angular positions corresponding to successive stop values are spaced geometrically and, as among the various lens units, equally. Each lens (indicated in FIG. 2 by line 26), is set at its maximum aperture at a zero angle of adjustment.

Figure 3:
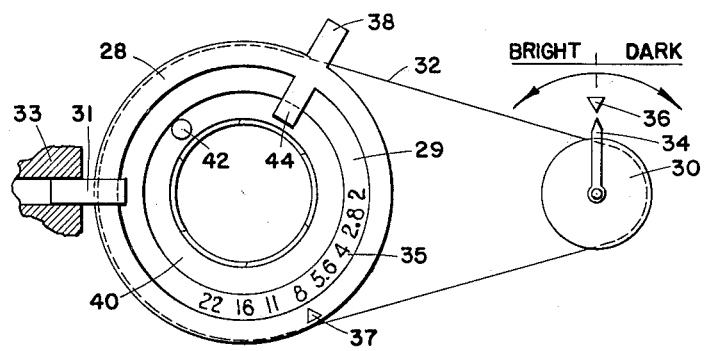
FIGS. 3–5 are schematic front views of a portion of a camera illustrating the invention with the preselecting member adjusted to various initial positions corresponding to various interchangeable lenses.
Figure 4:
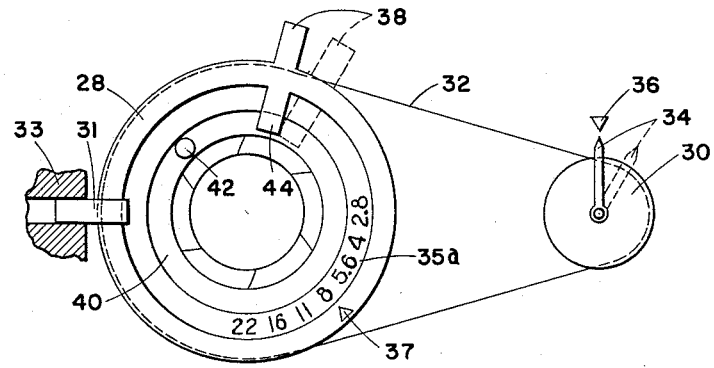
Figure 5:
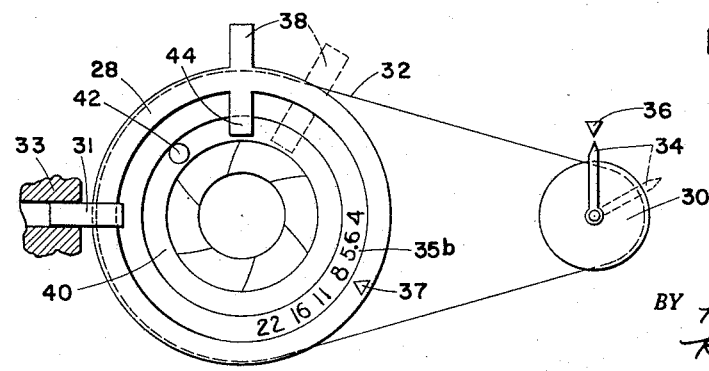

Referring to FIGS. 3–5, a diaphragm preselecting ring 28 is mechanically coupled to the measuring instrument 30, for example by a cord 32, such that angular movement of ring 28 is transmitted to the measuring instrument for moving the latter about its axis. The various interchangeable lens units are selectively attached to the preselecting ring 28, after which the photocell 19 (FIG. 1) receives its light through the fully opened taking lens diaphragm.

A scale ring, such as illustrated in FIG. 3 at 29, constitutes a part of each interchangeable lens unit and has an ear 31 cooperating with a fixed anchor member 33 to maintain ring 29 in a fixed angular position in the camera. An aperture scale 35 is carried by ring 29 and cooperates with an index mark 37 on the preselecting ring 28.

Figure 8:
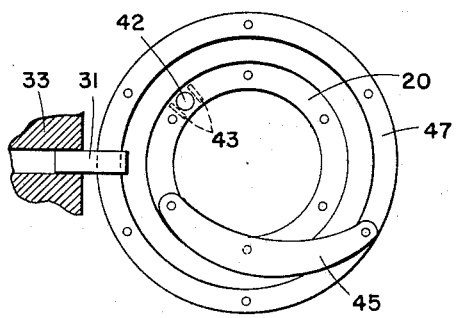
FIG. 8 is a partial front view of the diaphragm setting ring and the diaphragm preselecting ring.

FIG. 8 illustrates the usual diaphragm setting ring 20 associated with the lens having a maximum aperture of f/2. A single diaphragm blade 45 is illustrated in FIG. 8, showing its pivotal mounting to the setting ring 20 and a stationary outer ring 47.

The instrument pointer 34 (FIG. 3) is aligned with an index mark 36 by turning the preselecting ring 28 about the lens axis. For this purpose a lever 38 on ring 28 is accessible from the outside of the camera. Pointer 34 and mark 36 may be disposed in the viewfinder (not shown) for convenience in aligning these two members.

Figure 6:
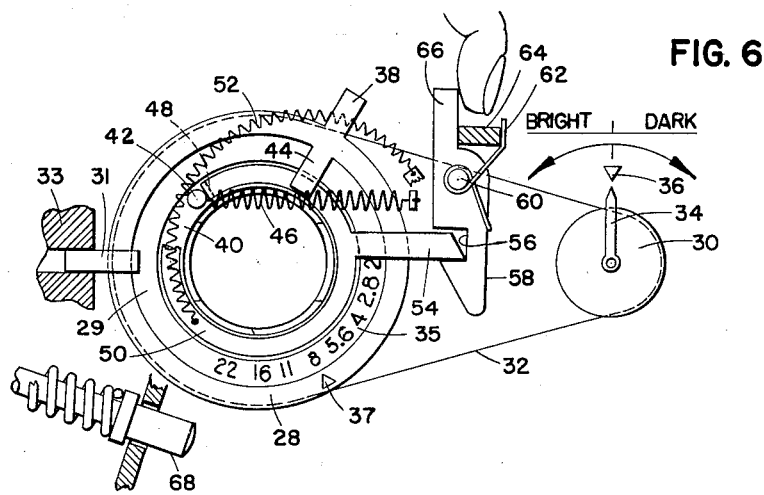
FIGS. 6 and 7 are schematic front views of a portion of the camera illustrating the relation of the camera actuating member, the diaphragm control ring and the shutter release member.
Figure 7:
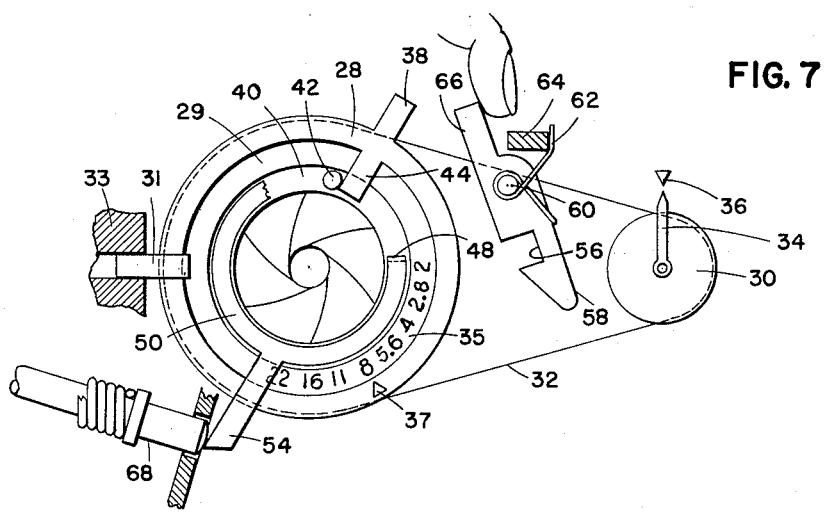

A diaphragm control ring 40 carries a sensing pin 42 and is adapted to move clockwise from its initial position (FIG. 3) until the sensing pin 42 engages an ear 44 on the preselecting ring 28. A spring 46 (FIGS. 6 and 7) urges the sensing pin 42 and control ring 40 clockwise about the lens axis. A pair of lugs 43 (FIG. 8) on the diaphragm setting ring 20 bracket the sensing pin 42 on the control ring, such that rings 20 and 40 turn together after attachment of the lens unit. The setting ring 20 and the control ring 40 are normally maintained in their initial or counterclockwise position, as shown in FIGS. 6 and 8, by a lug 48 which engages the clockwise surface of the sensing pin 42. Lug 48 is mounted on an actuating ring 50, which is urged clockwise by a spring 52 secured to the actuating ring. An arm 54 on the actuating ring normally engages a notch 56 on the camera actuating member 58, which is pivotally mounted at 60 and is urged clockwise about its pivot by a spring 62, maintaining n arm 66 at rest against a stop 64. The arm 66 is accessible from the outside of the camera for manual movement of member 58 counterclockwise against the tension of spring 62, which releases arm 54 of ring 50 from notch 56 and permits spring 52 to move ring 50 and its lug 48 clockwise. This permits spring 46 to rock the diaphragm control ring clockwise, along with the sensing pin 42, lugs 43 (FIG. 8) and the diaphragm 20, for reducing the diaphragm aperture.

Clockwise adjustment of the diaphragm setting ring 20 is limited by the engagement of the sensing pin 42 with the stop member 44 (FIG. 7) on the diaphragm preselecting lever 28. The actuating ring 50 continues its clockwise movement, after the sensing pin 42 engages the stop member 44, until arm 54 of the actuating ring trips the shutter release member, indicated at 68.

The operation of the mechanism is as follows:

When an interchangeable lens unit is inserted in the camera, as in FIG. 3, the preselecting ring 28 is adjusted by means of lever 38 until the instrument pointer 34 is aligned with index mark 36. This aligns index mark 37 on preselecting ring 28 with some aperture value on scale 35, representing the proper exposure aperture in view of the selected shutter and film speed, filter factor, etc. In the example shown in the drawings the resulting aperture value is $f/8$.

Upon operation of the camera actuating member 66 (FIGS. 6 and 7) the sensing pin 42 moves clockwise for adjusting the diaphragm until it engages stop member 44 on the preselecting lever. The angular movement of pin 44 adjusts the diaphragm from its maximum aperture, $f/2$, to the proper exposure aperture, $f/8$.

Referring to FIG. 4, when a lens having a maximum aperture of $f/2.8$ is substituted for the faster lens illustrated in FIG. 3, the photocell receives less field light because of a smaller aperture and the instrument pointer therefor is deflected only to the position indicated in broken lines in FIG. 4. Accordingly, lever 38 must be moved from its broken line position in FIG. 4 to its solid line position to restore alignment between pointer 34 and index mark 36. This moves the stop member 44 on ring 28 closer to the initial position of sensing pin 42, so that upon subsequent clockwise movement of the control ring 40 the sensing pin adjusts the diaphragm by a smaller amount prior to engagement of stop member 44 by sensing pin 42. Because of the geometric spacing of the positions of the various diaphragm setting rings corresponding to successive stop values, the subsequent movement of sensing pin 42 into engagement with stop member 44 adjusts the new diaphragm to the proper exposure value, $f/8$.

Finally, upon substitution of a lens having a maximum aperture of $f/4$, as illustrated in FIG. 5, the instrument pointer 34 must be adjusted even further counterclockwise to realign it with index mark 36. This adjustment moves the stop member 44 even closer to the initial position of sensing pin 42. Consequently, the adjustment of the diaphragm to an aperture of $f/8$ is accomplished with a still smaller clockwise movement of sensing pin 42, control ring 40 and setting ring 20.

The essential feature of the invention lies in the fact that the same angle exists between the initial position of sensing pin 42 and the maximum aperture position of each lens diaphragm ($f/2$, $f/2.8$, $f/4$) as indicated on the respective scales 35, 35$a$ and 35$b$ of FIGS. 3–5, and that the angular distances through which the sensing pin must move for engaging stop member 44 at a given field brightness, in the cases of the various lenses, are related inversely to the respective sizes of the maximum apertures of those lenses.

The invention has been described in detail with particular reference to a preferred embodiment thereof, but it will be understood that variations and modifications can be effected within the spirit and scope of the invention as described hereinabove and as defined in the appended claims.

I claim:

1. In a camera having a taking lens axis and adapted to mount, on said axis, any of a plurality of taking lenses having different maximum exposure apertures, each of said taking lenses having associated therewith a respective adjustable diaphragm normally in a maximum-aperture adjustment, said camera having an exposure control system including an electrical measuring instrument and a photocell illuminatable by scene light through the taking lens that is mounted on the camera, said measuring instrument having an indicator positionable as a function of the illumination of said photocell, the combination comprising:

(a) means carrying an index mark;
   (b) means for moving said measuring instrument to position said indicator in a predetermined relation with said index mark;
   (c) a stop member coupled to said instrument for movement therewith;
   (d) a sensing member coupled to the diaphragm associated with said mounted lens, said sensing member having an initial position spaced from said stop member and being adapted for movement into engagement with said stop member to adjust said last-named diaphragm as a function of the illumination of said photocell; and
   (e) manually operable means for moving said sensing member into engagement with said stop member.

2. The combination defined in claim 1, with: first and second rings mounted for angular movement about said taking lens axis, said stop member being mounted on said first ring and said sensing member being mounted on said second ring.

References Cited in the file of this patent

UNITED STATES PATENTS

| | | |
|---|---|---|
| 3,013,478 | Gebele | Dec. 19, 1961 |
| 3,071,054 | Singer | Jan. 1, 1963 |